US012643132B2

(12) United States Patent
Jin et al.

(10) Patent No.: US 12,643,132 B2
(45) Date of Patent: Jun. 2, 2026

(54) LIFTING CONTROL APPARATUSES AND CLEANERS INCLUDING THE SAME

(71) Applicant: TCL ZHONGHUAN RENEWABLE ENERGY TECHNOLOGY CO., LTD., Tianjin (CN)

(72) Inventors: Lihui Jin, Tianjin (CN); Hua Yang, Tianjin (CN); Zhigao Ren, Tianjin (CN); Xiaoguang Zhao, Tianjin (CN); Hao Guo, Tianjin (CN); Chuanling Ai, Tianjin (CN); Dawei Wang, Tianjin (CN); Zhijun Wu, Tianjin (CN); Hongxia Cen, Tianjin (CN); Chen Wei, Tianjin (CN)

(73) Assignee: TCL ZHONGHUAN RENEWABLE ENERGY TECHNOLOGY CO., LTD., Tianjin (CN)

( * ) Notice: Subject to any disclaimer, the term of this patent is extended or adjusted under 35 U.S.C. 154(b) by 377 days.

(21) Appl. No.: 18/548,575

(22) PCT Filed: Jul. 31, 2023

(86) PCT No.: PCT/CN2023/110441

§ 371 (c)(1),
(2) Date: Sep. 1, 2023

(87) PCT Pub. No.: WO2023/241734

PCT Pub. Date: Dec. 21, 2023

(65) Prior Publication Data

US 2025/0018447 A1 Jan. 16, 2025

(30) Foreign Application Priority Data

Jun. 14, 2022 (CN) ........................ 202221479231.1

(51) Int. Cl.
*B08B 11/02* (2006.01)
*B08B 3/04* (2006.01)

(52) U.S. Cl.
CPC ................ *B08B 11/02* (2013.01); *B08B 3/04* (2013.01)

(58) Field of Classification Search
None
See application file for complete search history.

(56) References Cited

U.S. PATENT DOCUMENTS 3,768,628 A * 10/1973 Bross ..................... B65G 65/44 187/214
4,923,054 A * 5/1990 Ohtani ............. H01L 21/68707 414/331.14
5,702,222 A * 12/1997 Rosen ....................... E04H 6/06 187/214

FOREIGN PATENT DOCUMENTS

CN 101972751 A 2/2011
CN 107681023 A 2/2018

(Continued)

OTHER PUBLICATIONS

International Search Report in International application No. PCT/CN2023/110441, mailed on Oct. 12, 2023.

(Continued)

*Primary Examiner* — Michael S Lowe
(74) *Attorney, Agent, or Firm* — PV IP PC; Wei Te Chung

(57) ABSTRACT

A lifting control apparatus may include: a base for holding a basket containing silicon wafers; brackets provided on an outside of both ends of the base; and a driver for driving the brackets to move up and down. The driver is provided with a lead screw. The lead screw is connected with the bracket on a same side. The lead screw on one side is driven to rotate the lead screw on another side synchronously, and the lead (Continued)

screws on both sides are driven to move the brackets on both sides and the base between the brackets up and down together. Or the lead screws on both sides are driven to rotate synchronously, so that the lead screws on both sides drive the base between the brackets through the correspondingly brackets to move up and down together.

20 Claims, 3 Drawing Sheets

(56) References Cited

FOREIGN PATENT DOCUMENTS

| | | | |
|---|---|---|---|
| CN | 107999458 | A | 5/2018 |
| CN | 216174798 | U | 4/2022 |
| CN | 217847907 | U | 11/2022 |

OTHER PUBLICATIONS

Written Opinion of the International Search Authority in International application No. PCT/CN2023/110441, mailed on Oct. 12, 2023.

* cited by examiner

LIFTING CONTROL APPARATUSES AND CLEANERS INCLUDING THE SAME

CROSS-REFERENCE TO RELATED APPLICATION

The present disclosure claims priority to and the benefit of Chinese Patent Application No. 202221479231.1, filed on Jun. 14, 2022, the disclosure of which is incorporated herein by reference in its entirety.

TECHNICAL FIELD

The present disclosure relates to auxiliary equipment for cleaning a silicon wafer, and in particular, to lifting control apparatuses.

BACKGROUND

Related arts propose a throwing mechanism for lifting in which one end is suspended by two vertical wire ropes and can be moved up and down upon driven by powered another end. This kind of single-arm wire rope suspension is extremely unstable. The wire rope itself is a flexible member, which is easily shaken by vibration and is easily broken by wear. Once any one of the wire ropes is broken, the stability of the whole throwing will no longer exist, which directly affects the quality of cleaning silicon wafers, and even the silicon wafers may hit a basket containing them due to vibration, resulting in serious cracking of the silicon wafers.

SUMMARY

In view of the above, an embodiment of the present disclosure provides a lifting control apparatus, which includes: a base for holding a basket containing silicon wafers; brackets provided on an outside of both ends of the base; and a driver provided on an outside of the brackets for driving the brackets to move up and down; wherein the driver is provided with a lead screw; the lead screw is connected with the bracket on a same side; the lead screw on one side is driven to rotate the lead screw on another side synchronously, and the lead screws on both sides are driven to move the brackets on both sides and the base between the brackets up and down together; or, the lead screws on both sides are driven to rotate synchronously, so that the lead screws on both sides drive the base between the brackets through the correspondingly brackets to move up and down together.

In some embodiments of the present disclosure, the driver is configured to drive the first lead screw to rotate to drive the second lead screw to rotate synchronously with the first lead screw, to drive the first bracket and the second bracket to move up and down.

In some embodiments of the present disclosure, the driver is configured to drive the first lead screw and the second lead screw to rotate synchronously, to drive the first bracket and the second bracket to move up and down.

In some embodiments of the present disclosure, the first bracket includes two first vertical rods disposed in parallel and a first transverse plate connecting the two first vertical rods; the second bracket includes two second vertical rods disposed in parallel and a second transverse plate connecting the two second vertical rods; one end of the first vertical rod is connected with one corner end of the base, and another end of the first vertical rod is connected with one end of the first transverse plate through an extended short rod; one end of the second vertical rod is connected with one corner end of the base, and another end of the second vertical rod is connected with one end of the second transverse plate through an extended short rod; the first transverse plate is disposed on an outside of the first vertical rod and at an upper end of the first vertical rod; and the second transverse plate is disposed on an outside of the second vertical rod and at an upper end of the second vertical rod.

In some embodiments of the present disclosure, the first lead screw is vertically disposed and located in a midline of the first transverse plate; the second lead screw is vertically disposed and located in a midline of the second transverse plate; the upper end of the first vertical rod is higher than a upper limit position of the first bracket and a lower end of the first vertical rod is lower than a lower limit position of the base; and the upper end of the second vertical rod is higher than a upper limit position of the second bracket and a lower end of the second vertical rod is lower than a lower limit position of the base.

In some embodiments of the present disclosure, the driver further comprises two first guide posts disposed on both sides of the first lead screw and disposed in parallel with the first lead screw, and both ends of the first guide post are fixedly disposed on a first fixing plate disposed in parallel with each other, and are integrally connected with the first lead screw on a same side through the first fixing plate; and the driver further comprises two second guide posts disposed on both sides of the second lead screw and disposed in parallel with the second lead screw, and both ends of the second guide post are fixedly disposed on a second fixing plate disposed in parallel with each other, and are integrally connected with the second lead screw on a same side through the second fixing plate.

In some embodiments of the present disclosure, a first sleeve is further provided on each of the first guide posts for engagement therewith, a first vertical plate is provided on one side of the first sleeve close to the first bracket, and the first vertical plate is connected with the first bracket; and a second sleeve is further provided on each of the second guide posts for engagement therewith, a second vertical plate is provided on one side of the second sleeve close to the second bracket, and the second vertical plate is connected with the second bracket.

In some embodiments of the present disclosure, the first lead screw and the second lead screw share a motor, and the first lead screw is connected directly with the motor; and the first lead screw and the second lead screw are connected through a driving belt.

In some embodiments of the present disclosure, the first lead screw and the second lead screw share a motor, and the second lead screw is connected directly with the motor; and the first lead screw and the second lead screw are connected through a driving belt.

In some embodiments of the present disclosure, a tensioning wheel is further provided on the driving belt.

In some embodiments of the present disclosure, an output end of the motor is connected with the first lead screw through a belt; and a connecting point between the first lead screw and the motor is located above a connecting point between the first lead screw and the driving belt.

In some embodiments of the present disclosure, an output end of the motor is connected with the second lead screw through a belt; and a connecting point between the second lead screw and the motor is located above a connecting point between the second lead screw and the driving belt.

In some embodiments of the present disclosure, the first lead screw and the second lead screw are disposed independently, and each of the first lead screw and the second lead screw is configured with a motor.

An embodiment of the present disclosure further provides a cleaner including the above-mentioned lifting control apparatus.

List of reference signs:

| | | |
|---|---|---|
| 10: Base; | 20: Bracket; | 21: Vertical rod; |
| 22: Transverse plate; | 30: Driver; | 31: Lead screw; |
| 32: Motor; | 33: Driving belt; | 34: Tensioning wheel; |
| 35: Guide post; | 36: Fixing plate; | 37: Sleeve; |
| 38: Vertical plate. | | |

DETAILED DESCRIPTION

The present disclosure will now be further described with reference to the accompanying drawings and some embodiments.

Embodiment 1

Figure 1:
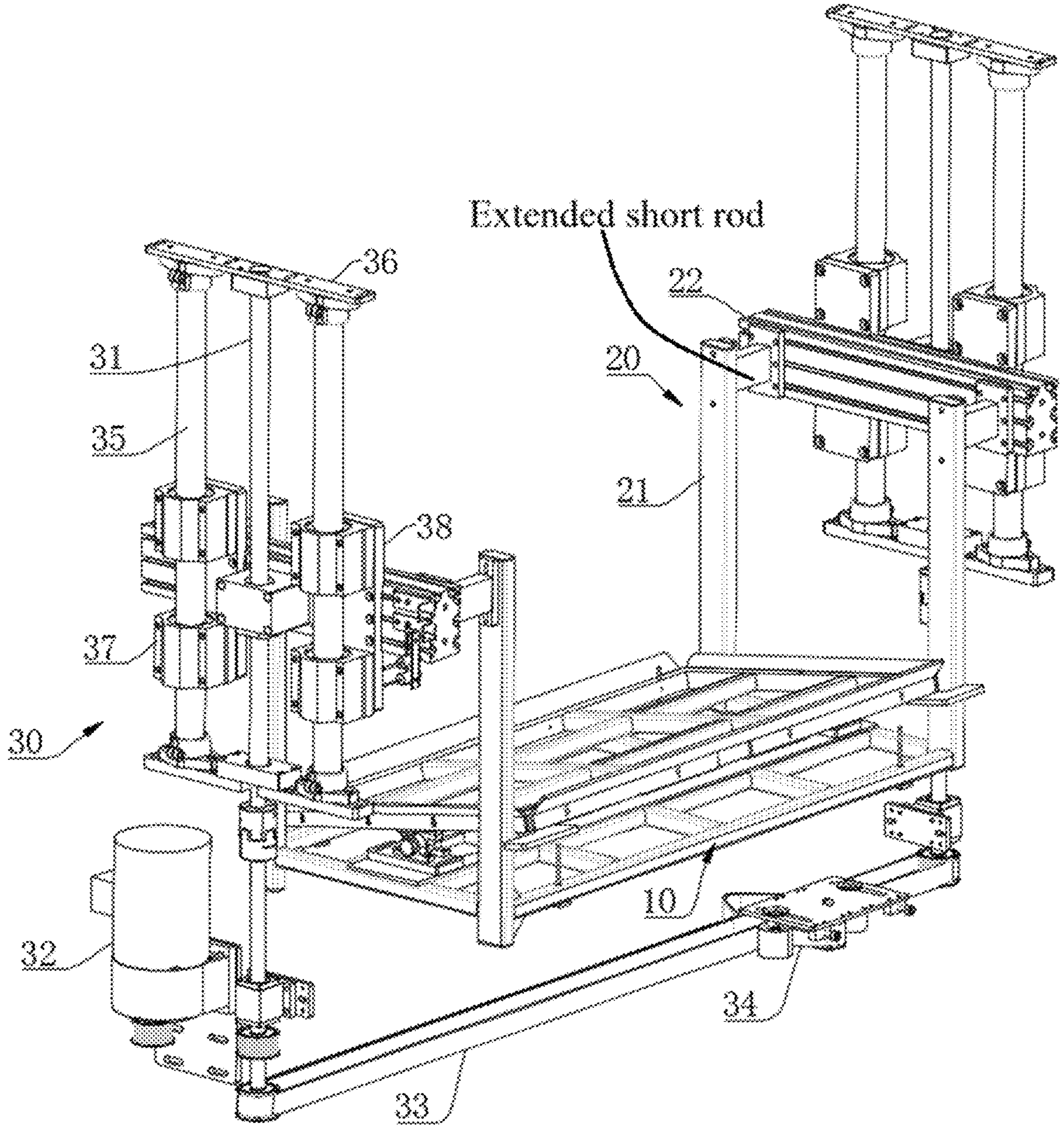
FIG. 1 is a perspective view of a lifting control apparatus from one side thereof according to an embodiment of the present disclosure.
Figure 2:
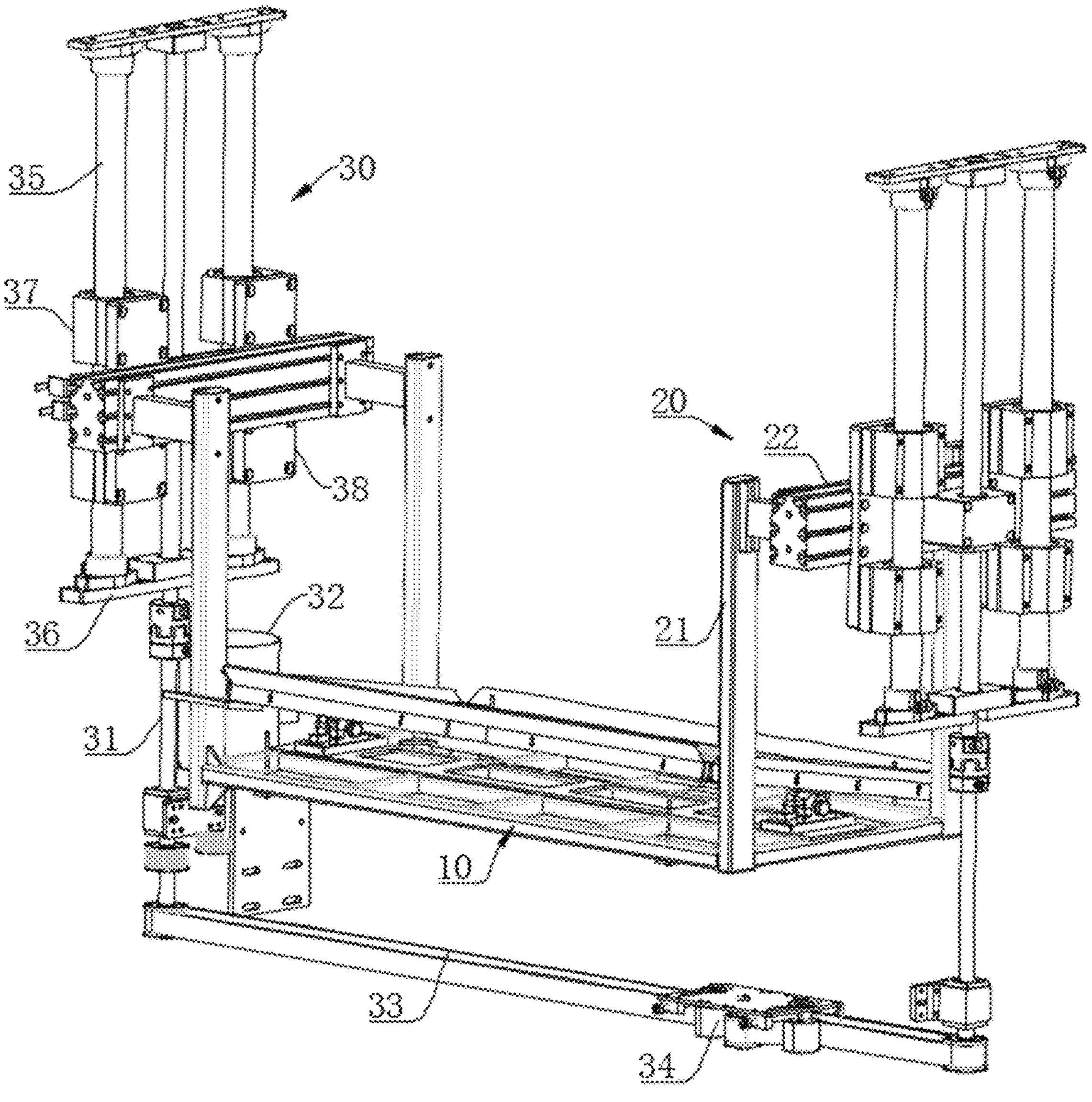
FIG. 2 is a perspective view of the lifting control apparatus from the other side thereof according to an embodiment of the present disclosure.

This embodiment provides a lifting control apparatus, as shown in FIGS. 1-2, which includes a base 10 for holding a basket containing silicon wafers, brackets 20 provided on an outside of both ends of the base 10, and a driver 30 provided on an outside of the brackets 20 for driving the brackets 20 to move up and down. The brackets 20 on both sides have the same structure, that is, each bracket 20 includes two vertical rods 21 disposed in parallel and a transverse plate 22 connecting the two vertical rods 21; one end of each vertical rod 21 is connected with one corner end of the base 10, and another end of the vertical rod 21 is connected with one end of the transverse plate 22 through an extended short rod; all the vertical rods 21 are disposed perpendicular to the plane of the base 10, and the transverse plates 22 are vertically cross-connected with the vertical rods 21. Each driver 30 is provided with a lead screw 31, and two lead screws 31 on both sides are provided with only one motor 32. The screw 31 is connected with the bracket 20 on the same side, and the lead screws 31 on both sides are connected by a driving belt 33.

In operation, the lead screw 31 on one side is driven by the driver 30, and the lead screw 31 on the other side can rotate synchronously following with the driving belt 33 disposed therebetween. The brackets 20 connected with the lead screws 31 on both sides and the base between the brackets 20 are driven to move up and down following with the lead screws 31, thus realizing the up and down movement of a tank under the action of lifting.

In this embodiment, two vertically mechanical brackets 20 are fixedly disposed at both ends of the base 10 on which a basket containing silicon wafers is placed. Meanwhile, a driver 30 with bilateral mechanical transmission structures are respectively used to pull the brackets 20 to vertically move up and down, so that the base 10 and the basket containing silicon wafers above the base 10 can be stably vertically moved up and down without causing a shaking phenomenon when a rope is suspended as in the related arts. Further, the fixing strength during the whole lifting and moving process is improved, so that the base 10 vertically moves up and down more stably without being easily damaged, and the service life is prolonged.

Further, in order to improve the safety of the whole lifting control apparatus, it is required that the transverse plate 22 on each side is disposed on an outside of the vertical rod 21 and at an upper end of the vertical rod 21.

Further, the lead screw 31 is vertically disposed in a midline of the transverse plate 22. In order to ensure the height of the whole base 10 and the tank above the base 10 and the cleaning quality of the silicon wafers in the basket containing silicon wafers, it is required that the height of the vertical rod 21 is higher than an upward movement height of the tank under the action of lifting, that is, an upper end of the vertical rod 21 is higher than an upper limit position of the bracket 20, and a lower end of the vertical rod 21 is lower than a lower limit position of the base 10. Meanwhile, the driving belt 33 is located below the lower limit of the base 10 to prevent the position of the driving belt 33 from interfering with the up and down movement of the base 10.

Further, the lead screw 31 on one side is directly connected with the motor 32, that is, the lead screws 31 on both sides share one motor 32, which can be connected with the lead screw 31 on either side, and the output end of the motor 32 is connected with the lead screw 31 through a belt.

Further, a connecting point between the lead screw 31 and the motor 32 is located above a connecting point between the lead screw 31 and the driving belt 33. That is, the force output by the motor 32 is transmitted bidirectionally through the lead screw 31, so that the lead screws 31 on both sides move synchronously and in the same direction.

Further, the driver 30 further includes guide posts 35 disposed on both sides of the lead screw 31 and disposed in parallel with the lead screw 31, and fixing plates 36. Both ends of the guide post 35 are fixedly disposed on the fixing plate 36 disposed in parallel with each other. An upper end face of the lead screw 31 is fixed on the fixing plates 36 at the uppermost end, and the fixing plate 36 at the lowermost end is penetrated by the lead screw 31. Two guide posts 35 are integrally connected to the lead screw 31 on the same side through the fixing plate 36.

Further, an sleeve 37 is further provided on each of the guide posts 35 for engagement therewith, and a vertical plate 38 is provided on one side of the sleeve 37 close to the bracket 20. In order to ensure the stability of the sleeve 37 sliding along the guide post 35, two sleeves 37 are provided on the same guide post 35 at intervals, and the two sleeves 37 are integrally connected by the vertical plate 38. Each vertical plate 38 is connected with the horizontal plate 22 in the bracket 20. The lead screw 31 is connected with the transverse plate 22 through a nut sleeved on it, and the transverse plate 22 is connected with the sleeve 37 through a vertical plate 38, so that the sleeve 37 can be vertically moved up and down in the height direction of the guide post 35 when the lead screw 31 drives the bracket 20 and the base 10 to move up and down as a whole, thereby ensuring the stability of the vertical up and down movement of the base 10.

Further, in order to ensure the stability and accuracy of the synchronous transmission of the two lead screws 31, a tensioning wheel 34 is further provided on the driving belt 33.

Embodiment 2

Figure 3:
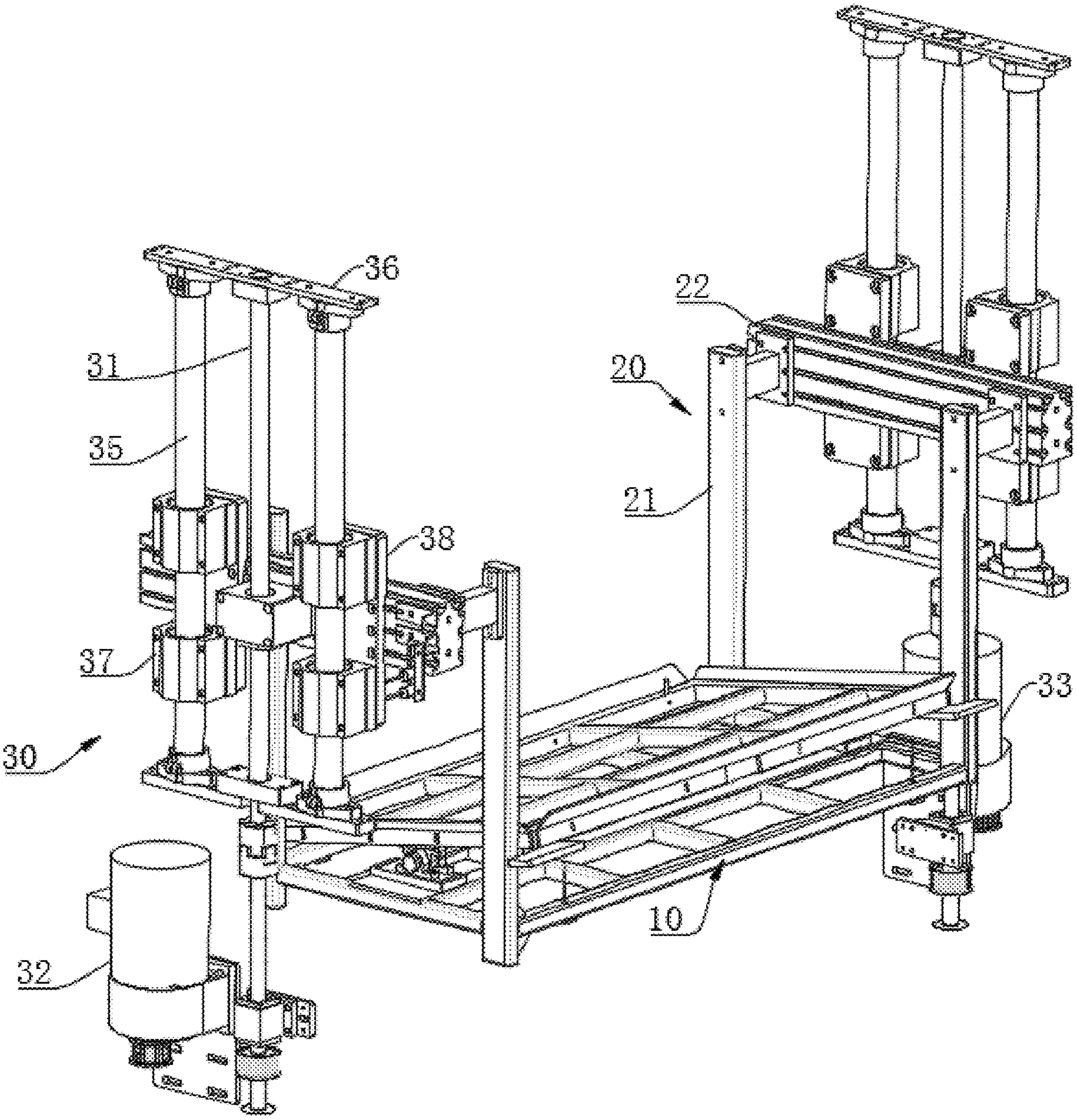
FIG. 3 is a perspective view of a lifting control apparatus according to another embodiment of the present disclosure.

As shown in FIG. 3, the most significant difference between this embodiment and embodiment is that two motors 32 are used to control two screws 31 respectively, and there is no need for a driving belt 33 and a tensioning wheel 34. In this embodiment, both ends of the base 10 are symmetrically provided with two brackets 20 and two drivers 30 connected with the brackets 20. The two lead screws 31 are respectively controlled by two independent motors 32, and are connected through a belt. Two motors 32 are synchronously turned on to drive the two lead screws 31 to move up or down in the same direction, so that the base 10 can move up or down synchronously following the brackets 20, thereby realizing synchronous control of both ends of the base 10. This structure is also connected by synchronous coordination of mechanical structures to realize the movement control of the stability of the base 10. It is also possible to solve the shaking problem caused by suspension of a steel wire rope in the related arts, and improve the working efficiency and service life of the lifting control apparatus during the whole cleaning process.

A cleaning machine equipped with any one of the abovementioned lifting control apparatus.

The slow lifting control apparatus designed by the present disclosure adopts a driver with bilateral mechanical structure, which is stable in the overall coordination, high in strength, consistent in throwing rhythm, and free from shaking, thus prolonging the service life of the whole throwing control apparatus.

Some embodiments of the present disclosure have been described in detail above, but are not intended to limit the scope of the present disclosure. All equivalent changes and modifications made in accordance with the present disclosure shall still fall within the scope of the present disclosure.

What is claimed is:

1. A lifting control apparatus, comprising:

a base for holding a basket containing silicon wafers;

a first bracket provided on a first side of the base;

a second bracket provided on a second side of the base opposite to the first side; and a driver provided with a first lead screw and a second lead screw, the first lead screw being provided on the first side of the base and connected with the first bracket, the second lead screw being provided on the second side of the base and connected with the second bracket, wherein the driver is configured to drive the first bracket and the second bracket respectively by the first lead screw and the second lead screw to move up and down, to drive the base between the first bracket and the second bracket to move up and down together;

wherein the driver comprises two first guide posts disposed on both sides of the first lead screw and disposed in parallel with the first lead screw, and two second guide posts disposed on both sides of the second lead screw and disposed in parallel with the second lead screw;

wherein two first sleeves are further provided at intervals on each of the first guide posts for engagement therewith, and two second sleeves are further provided at intervals on each of the second guide posts for engagement therewith; and a height of the first lead screw is greater than that of the first bracket, and a height of the second lead screw is greater than that of the second bracket.

2. The apparatus according to claim 1, wherein the driver is configured to drive the first lead screw to rotate to drive the second lead screw to rotate synchronously with the first lead screw, to drive the first bracket and the second bracket to move up and down.

3. The apparatus according to claim 1, wherein the driver is configured to drive the first lead screw and the second lead screw to rotate synchronously, to drive the first bracket and the second bracket to move up and down.

4. The apparatus according to claim 1, wherein the first bracket comprises two first vertical rods disposed in parallel and a first transverse plate connecting the two first vertical rods, the second bracket comprises two second vertical rods disposed in parallel and a second transverse plate connecting the two second vertical rods;

one end of the first vertical rod is connected with one corner end of the base, and another end of the first vertical rod is connected with one end of the first transverse plate through an extended short rod;

one end of the second vertical rod is connected with one corner end of the base, and another end of the second vertical rod is connected with one end of the second transverse plate through an extended short rod;

the first transverse plate is disposed on an outside of the first vertical rod and at an upper end of the first vertical rod; and the second transverse plate is disposed on an outside of the second vertical rod and at an upper end of the second vertical rod.

5. The apparatus according to claim 4, wherein the first lead screw is vertically disposed and located in a midline of the first transverse plate, the second lead screw is vertically disposed and located in a midline of the second transverse plate;

the upper end of the first vertical rod is higher than a upper limit position of the first bracket and a lower end of the first vertical rod is lower than a lower limit position of the base; and the upper end of the second vertical rod is higher than a upper limit position of the second bracket and a lower end of the second vertical rod is lower than a lower limit position of the base.

6. The apparatus according to claim 5, wherein the driver further comprises two first guide posts disposed on both sides of the first lead screw and disposed in parallel with the first lead screw, and both ends of the first guide post are fixedly disposed on a first fixing plate disposed in parallel with each other, and are integrally connected with the first lead screw on a same side through the first fixing plate; and the driver further comprises two second guide posts disposed on both sides of the second lead screw and disposed in parallel with the second lead screw, and both ends of the second guide post are fixedly disposed on a second fixing plate disposed in parallel with each other, and are integrally connected with the second lead screw on a same side through the second fixing plate.

7. The apparatus according to claim 4, wherein the driver further comprises two first guide posts disposed on both sides of the first lead screw and disposed in parallel with the first lead screw, and both ends of the first guide post are fixedly disposed on a first fixing plate disposed in parallel with each other, and are integrally connected with the first lead screw on a same side through the first fixing plate; and the driver further comprises two second guide posts disposed on both sides of the second lead screw and disposed in parallel with the second lead screw, and both ends of the second guide post are fixedly disposed on a second fixing plate disposed in parallel with each other, and are integrally connected with the second lead screw on a same side through the second fixing plate.

8. The apparatus according to claim 4, wherein the first lead screw and the second lead screw share a motor, and the first lead screw is connected directly with the motor; and the first lead screw and the second lead screw are connected through a driving belt.

9. The apparatus according to claim 4, wherein the first lead screw and the second lead screw share a motor, and the second lead screw is connected with the motor; and the first lead screw and the second lead screw are connected through a driving belt.

10. The apparatus according to claim 4, the first lead screw and the second lead screw are disposed independently, and each of the first lead screw and the second lead screw is configured with a motor.

11. The apparatus according to claim 1, wherein both ends of the first guide post are fixedly disposed on a first fixing plate disposed in parallel with each other, and are integrally connected with the first lead screw on a same side through the first fixing plate; and both ends of the second guide post are fixedly disposed on a second fixing plate disposed in parallel with each other, and are integrally connected with the second lead screw on a same side through the second fixing plate.

12. The apparatus according to claim 11, wherein a first vertical plate is provided on one side of the first sleeve close to the first bracket, and the first vertical plate is connected with the first bracket; and a second vertical plate is provided on one side of the second sleeve close to the second bracket, and the second vertical plate is connected with the second bracket.

13. The apparatus according to claim 1, wherein the first lead screw and the second lead screw share a motor, and the first lead screw is connected with the motor; and the first lead screw and the second lead screw are connected through a driving belt.

14. The apparatus according to claim 13, wherein a tensioning wheel is further provided on the driving belt.

15. The apparatus according to claim 14, wherein an output end of the motor is connected with the first lead screw through a belt; and a connecting point between the first lead screw and the motor is located above a connecting point between the first lead screw and the driving belt.

16. The apparatus according to claim 1, wherein the first lead screw and the second lead screw share a motor, and the second lead screw is connected with the motor; and the first lead screw and the second lead screw are connected through a driving belt.

17. The apparatus according to claim 16, wherein a tensioning wheel is further provided on the driving belt.

18. The apparatus according to claim 17, wherein an output end of the motor is connected with the second lead screw through a belt; and a connecting point between the second lead screw and the motor is located above a connecting point between the second lead screw and the driving belt.

19. The apparatus according to claim 1, the first lead screw and the second lead screw are disposed independently, and each of the first lead screw and the second lead screw is configured with a motor.

20. A cleaner comprising a lifting control apparatus, which comprises:

a base for holding a basket containing silicon wafers;

a first bracket provided on a first side of the base;

a second bracket provided on a second side of the base opposite to the first side; and a driver provided with a first lead screw and a second lead screw, the first lead screw being provided on the first side of the base and connected with the first bracket, the second lead screw being provided on the second side of the base and connected with the second bracket, wherein the driver is configured to drive the first bracket and the second bracket respectively by the first lead screw and the second lead screw to move up and down, to drive the base between the first bracket and the second bracket to move up and down together;

wherein the driver comprises two first guide posts disposed on both sides of the first lead screw and disposed in parallel with the first lead screw, and two second guide posts disposed on both sides of the second lead screw and disposed in parallel with the second lead screw;

wherein two first sleeves are further provided at intervals on each of the first guide posts for engagement therewith, and two second sleeves are further provided at intervals on each of the second guide posts for engagement therewith; and a height of the first lead screw is greater than that of the first bracket, and a height of the second lead screw is greater than that of the second bracket.

* * * * *